(12) United States Patent  (10) Patent No.: US 8,523,101 B2
Cazals et al.  (45) Date of Patent: Sep. 3, 2013

(54) SHORT TAKE-OFF AIRCRAFT

(75) Inventors: Olivier Cazals, Daux (FR); Alexander Koch, Eppstein (DE)

(73) Assignee: Airbus Operations SAS (FR)

( * ) Notice: Subject to any disclaimer, the term of this patent is extended or adjusted under 35 U.S.C. 154(b) by 802 days.

(21) Appl. No.: 12/178,711

(22) Filed: Jul. 24, 2008

(65) Prior Publication Data

US 2009/0026308 A1 Jan. 29, 2009

(30) Foreign Application Priority Data

Jul. 26, 2007 (FR) ...................... 07 05465

(51) Int. Cl.
B64C 15/00 (2006.01)

(52) U.S. Cl.
USPC ........................................ 244/12.5

(58) Field of Classification Search
USPC ............... 244/12.5, 1 N, 89, 211, 35 A, 45 R, 244/48, 55, 54, 129.1
See application file for complete search history.

(56) References Cited

U.S. PATENT DOCUMENTS

| | | | |
|---|---|---|---|
| 3,730,460 A | | 5/1973 | Mederer |
| 3,936,017 A | * | 2/1976 | Blythe et al. ............... 244/110 B |
| 4,030,688 A | * | 6/1977 | Pellarini ......................... 244/13 |
| 4,398,683 A | * | 8/1983 | Schmetzer ................... 244/12.5 |
| 2007/0023571 A1 | | 2/2007 | Kawai et al. |
| 2007/0095972 A1 | * | 5/2007 | Buffenoir et al. ............... 244/15 |
| 2007/0176047 A1 | | 8/2007 | Moore et al. |

FOREIGN PATENT DOCUMENTS

GB 1397068 A 6/1975
WO 2006049553 A 5/2006

OTHER PUBLICATIONS

French Search Report dated Mar. 13, 2008.

* cited by examiner

*Primary Examiner* — Timothy D Collins
*Assistant Examiner* — Brian M O'Hara
(74) *Attorney, Agent, or Firm* — Lerner, David, Littenberg, Krumholz & Mentlik, LLP

(57) ABSTRACT

An aircraft capable of making short takeoffs and landings includes essentially a fuselage, a wing secured to the fuselage, a front horizontal stabilizer secured to the fuselage on the front end of the fuselage and at least two jet engines for propulsion. According to the architecture proposed, the propulsion engines are arranged side by side above the fuselage in a rear part of the fuselage with a width at least equal to the width of the propulsion group, a fuselage flap device is arranged in the back of the fuselage so that the fuselage flaps adopt at least a position in which the flaps are considerably in a horizontal plane and take at least a high-lift position in which the flaps are turned downward in such a way that the blast created by the jet engines is channeled towards the top surface of the fuselage flaps to induce a blowing effect.

11 Claims, 6 Drawing Sheets

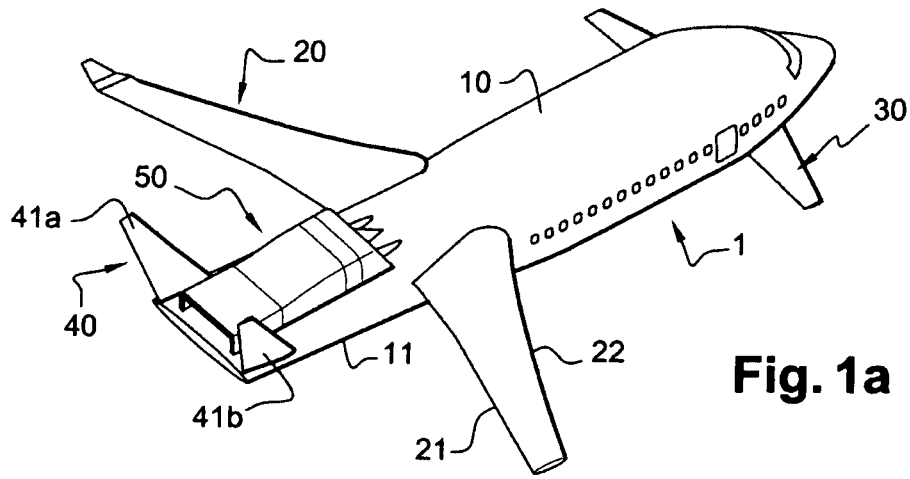
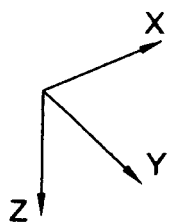
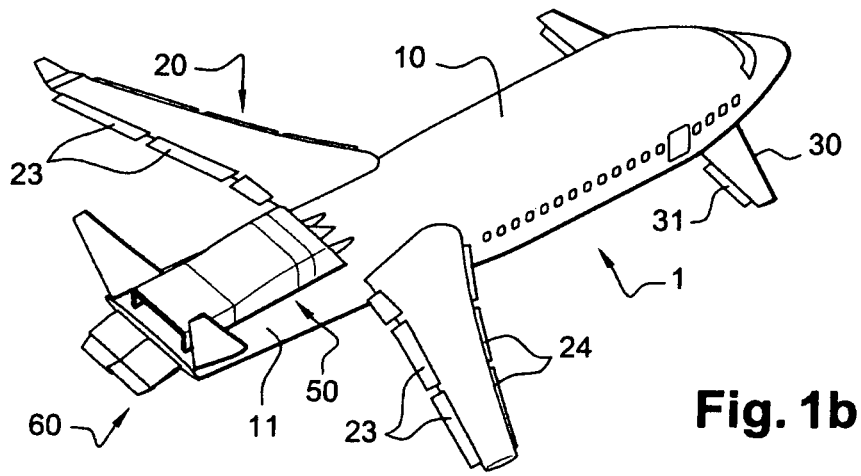

SHORT TAKE-OFF AIRCRAFT

BACKGROUND

1. Field

The disclosed embodiments fall in the domain of an aircraft that must land and take off on relatively short airstrips.

In particular, the disclosed embodiments involve civil transportation aircraft for which the combined arrangement of the fuselage, of the various aerodynamic surfaces and of the propulsion engines permits making an aircraft capable of operating on terrains of limited length and complying with the certification requirements of civil aircraft in particular in cases of takeoff and approach with failure of one engine.

The aircraft according the disclosed embodiments also permits making takeoffs and approaches with reduced noise impacts on the ground which is essential when using the aircraft in concentrated population environments such as mountainous environments or islands.

2. Brief Description of Related Developments

To reduce the takeoff and landing distances of aircraft for which the lift is ensured by a wing or by a set of lift aerodynamic surfaces, the solution that is the most generally used is to implement means that permit reducing the minimum flight speeds.

Indeed, reducing the minimum flight speeds enables an aircraft to limit the acceleration distance on the ground during takeoff and the deceleration distance on the ground during landing.

Increasing the thrust provided by the propulsion engines, in particular the ratio between engine thrust and aircraft weight, is also a practical solution to diminish the takeoff distances through a much stronger acceleration to reach the takeoff speed but the increase of thrust rapidly finds economic limits, in particular in the area of civil transportation aircraft, and causes sound nuisances that today are no longer acceptable in airport environments.

A first, widely used technique to increase the lift of the aircraft consists in arranging onto the lifting surfaces, in particular the wings, high-lift devices that result in pushing back the takeoff phenomena at lift factor values that are higher than those possible with a lifting surface not provided with such high-lift devices.

The trailing edge high-lift devices or wing flaps, also called flaps, and leading edge high-lift devices or leading edge slats, are widely used on civil transportation aircraft.

As such, for a conventional civil aircraft for which the wing has a lift factor around 1.6 without high-lift device (a so-called smooth configuration), in practice, lift coefficients between 2.5 and 3 are obtained when the high-lift devices are deployed for landing configurations.

In practice, the increase obtained for the maximum lift of an aircraft wing depends on the complexity of the high-lift systems and of the extension of the chord and the span of said systems.

Numerous high-lift forms, single, double or triple flaps, with or without slot, are known but on the one hand, it is difficult in practice to obtain lift factors of more than 3.5 and on the other hand, obtaining a high-lift coefficient is accompanied by complex high-lift systems that are as such heavy, expensive to make and expensive to maintain.

Finally, complex high-lift devices are the sources of parasitic drag that deteriorates the smoothness of the aircraft flight during the cruising phase, for a smooth configuration.

The solution of the conventional high-lift devices is as such inadequate to solve the problems encountered by a civil transportation aircraft that has to operate from short airstrips in urban environments and to keep cruising performances in accordance with the expectations for a line aircraft.

A second technique, associated with the first, to increase the lift of a wing is known by the designation flap blowing or upper surface blowing of the aerofoils.

By accelerating the air flow over the aerodynamic surfaces, this technique permits obtaining lifts that are higher than those associated with the simple progress speed of the aircraft in the air mass. Numerous variants of blowing exist.

For propeller aircraft for which the engines are secured to the wing, this technique is relatively practical to implement because naturally, the slipstream generated by the propellers involves the wing and the trailing edge flaps. On the Breguet 941 transport aircraft, this phenomenon has been used to obtain remarkable takeoff performances.

For jet engine aircraft, the techniques used or imagined consist in using the flows of the jet engines or an air flow taken from the jet engines to produce flap blowing (as on the Mc Donnell Douglas C17 cargo plane or on an experimental YC15 aircraft by the same builder) or of the upper surface of the wing (as on the NASA QSRA experimental aircraft).

However, these blowing techniques, if they permit looking for very increased lift coefficients up to a lift coefficient of 8 or more, are not without fault.

A first problem is linked to the fact that the motor installations must be designed for an efficient blowing in the low speed configurations of the aircraft; the effect of this is to penalize the cruising conditions during which these devices are useless, in particular by increasing the mass and the drag of the aircraft and by degrading the propulsion efficiency.

A second problem is linked to the extreme conditions in which operate the complex high-lift devices that, subject to the jet engine blast, undergo accelerated structural aging.

A third problem involves the handling of the aircraft in case of loosing an engine during a take-off or approach phase.

In this case, the risk of lift dissymmetry between the side of the wing carrying the failed engine and the other side of the wing generates a roll torque couple of rolls that risks causing the full loss of command over the aircraft. To limit the consequences of an engine loss, the known solutions make engine couplings, for instance by using a coupling arm for the propellers on the Breguet 941, or solutions looking to restore a balance of the lifts on each side of the wing by modifying the flap configurations, solutions that in general are complex. Not only are such solutions costly but also, the consequences of a failed engine that would result in losing control over the aircraft make such devices very difficult to certify on civil transportation aircraft, which partially explains that only experimental aircraft or military aircraft have implemented such solutions.

A third technique to increase the lift of an aircraft consists in using a portion of the engine lift to compensate a portion of the aircraft weight. According to this method called vector thrust, the jets of the engines on the aircraft are inclined downward, in general deviated in such a way that a component of the engine thrust is directed downward. The military Harrier aircraft by Hawker Siddley Aviation is a case of successful application of the vector thrust that even permits this jet engine to take off and to put itself down vertically at the expense of a thrust/weight ratio of more than 1 which is economically unthinkable for a civil transport aircraft.

As such, it appears that none of the known solutions permits achieving high-lift coefficients, higher than those obtained on the present civil transport aircraft, necessary for an aircraft with short takeoffs and landings under acceptable conditions for a civil transport aircraft in terms of penalties of cruising performances, mass and costs, and of certification.

SUMMARY

The purpose of the disclosed embodiments is precisely to define an aircraft architecture for which the layout permits obtaining the high lifts necessary for short takeoffs and landings for a conventional civil aircraft with similar dimensions while keeping control over the aircraft in case of engine failure.

For that, an aircraft according to the disclosed embodiments includes a fuselage, at least one wing secured to the fuselage, a front horizontal stabilizer, called duck stabilizer, secured to the fuselage on the side of the front end of the fuselage and two or more jet engines for propulsion.

According to the layout proposed by the disclosed embodiments:

the propulsion engines are arranged side by side in a propulsion assembly located above the fuselage in a rear part of said fuselage; and the rear part includes at least in the area of the propulsion assembly a width of at least equal to the width of said propulsion group, and a fuselage flap device is arranged at the back of the rear part of the fuselage in such a way that at least a flap of the fuselage is able to adopt at least a first position in which at least one flap is considerably in a horizontal plane with respect to the reference axes of the aircraft and to adopt at least a second position, called the high-lift position, in which at least one flap is turned according to a downward turning angle in the axes linked to the aircraft with respect to the first position;

in such a way that a stream created by the jets of the engines is channeled towards a higher surface of the fuselage flaps to induce a blowing effect of the flap or flaps.

To increase the lift capacities of the fuselage flap device, each fuselage flap preferably includes at least an additional trailing edge flap.

So as not to penalize the cruising flight phases when it is not necessary to have high-lift coefficients, the flaps of the fuselage flap device include beneficially a position in which the flaps are retracted as a whole or in part in an interior space at the rear part of the fuselage.

For instance, when the additional trailing edge flaps are implemented, the fuselage flap device includes a position for which the fuselage flaps are retracted partially in an interior space of the rear part of the fuselage so that the additional trailing edge flaps can be activated to provide a pitch control component for the aircraft.

Preferably, to improve the controllability of the aircraft in case of engine failure, the fuselage flap device includes at least an assembly of independent fuselage flaps for each engine, arranged on the fuselage, considerably in the back of the engine being considered.

Beneficially to balance the dive torque of the fuselage flap device when said device is in a high-lift configuration, the duck stabilizer that can be of a one-piece type, in other words, with a variable turning angle with respect to the fuselage, or of a type with trailing edge articulated rudders, is equipped with maximum lift increase devices, that can beneficially be retracted so as not to penalize the drag during cruising speed when the aircraft is adopting a smooth configuration.

To perform an efficient blowing of the fuselage flaps, the propulsion assembly includes structures that form aerodynamic channels in which the jet of each engine is channeled from the jet engine being considered to a channel outlet near the end of the fuselage rear part.

The propulsion assembly structures include among other stationary structures with respect to the fuselage, a first structure or part of a structure determining the air intakes of the jet engines and a second structure or part of a structure determining the separating walls between the adjacent walls associated with adjacent engines and preferably the jet engines are secured to the stationary structure forming the air intake of said jet engines to benefit from the conventional securing modes of the jet engines.

To achieve a sufficient safety level for such side by side set-up of the engines, the determining structure of the separating walls between the adjacent channels includes at least locally, reinforcement to ensure the protection of a jet engine against projections coming from a neighboring engine.

To modify the positions of the engine jets during operation and to approach, the best and permanently, a symmetric aircraft configuration for the blowing of the fuselage flaps when an engine drops out, movable deviation components of the aerodynamic flow, called deflectors, are arranged in a considerably vertical fashion in the aerodynamic channels formed by the propulsion assembly structures.

Preferably, the deflectors include first deviation components that are moved in rotation with respect to the fuselage around a rotation axis that is considerably vertical with respect to the aircraft and each deviation component includes at least a second rectifying component of the aerodynamic flow in the back of this first deviation component, with this second rectifier component being secured and articulated to the first deviation component at least according to an angular placement around an axis parallel to the rotation axis of said first component with respect to the fuselage, or else the second rectifier component is secured, articulated or not articulated, to an aircraft structure.

According to whether the engines are all operating or whether one of the engines has dropped out, the deflectors include a first position in which the engine jet is not deviated when all jet engines are in operation and include at least a second deviated position when one of the jet engines is out of order.

According to whether the fuselage flaps are deflected uniformly or not on the basis of their Y position on the fuselage, the deflectors include a first position in which the engine jet is not deviated when the flap deviations are uniform and includes at least a second deviated position when the flap deflections are not uniform so as to distribute the blowing in order to obtain the best lift for the fuselage flap system.

To permit easy maintenance of the components of the propulsion assembly, openings comprising maintenance traps doors are provided in the fuselage wall under the rear part of the fuselage at the level of the activators and drive mechanisms of the deflectors and maintenance wells considerably passing vertically through the fuselage are arranged in the rear portion of the fuselage in a considerably vertical position with the engines, with each well being of sufficient dimension to permit an engine pass through.

The detailed description of examples of embodiment is done while making reference to the illustrations that show schematically:

BRIEF DESCRIPTION OF THE DRAWINGS

Illustrations 1a and 1b: Overall view in perspective of an aircraft following the disclosed embodiments in a cruise flight configuration (illustration 1a) and in a high-lift configuration for takeoff and landing (illustration 1b);

Illustration 2a: side view of the aircraft of illustration 1b;

Figure 2A:
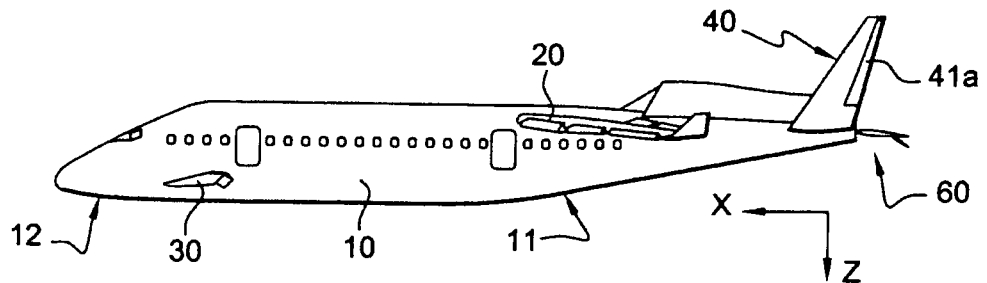
Figure 2B:
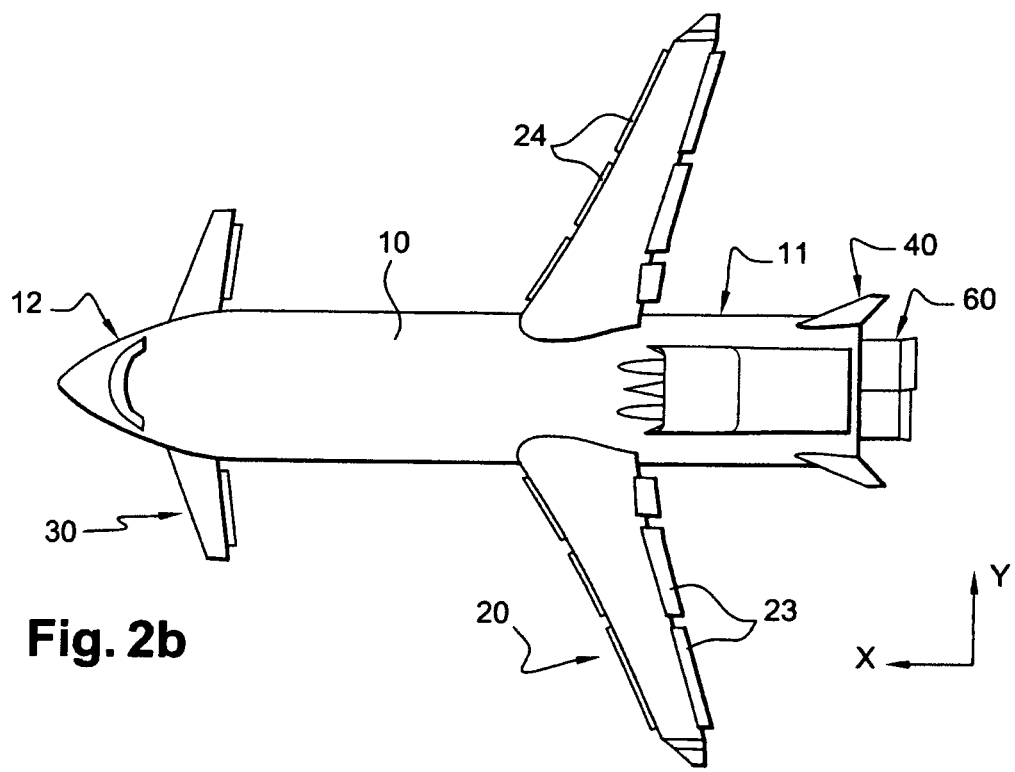
Figure 2C:
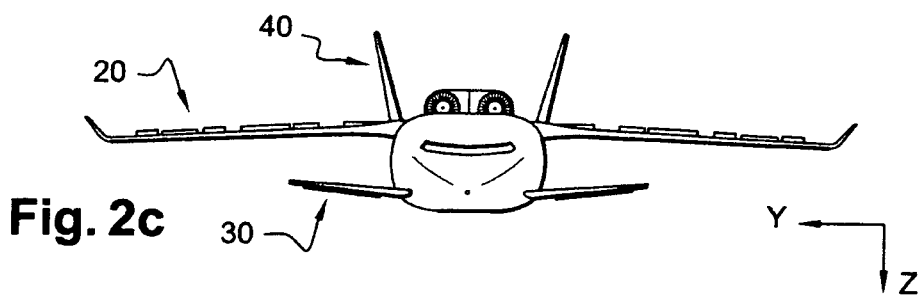
Figure 3A:
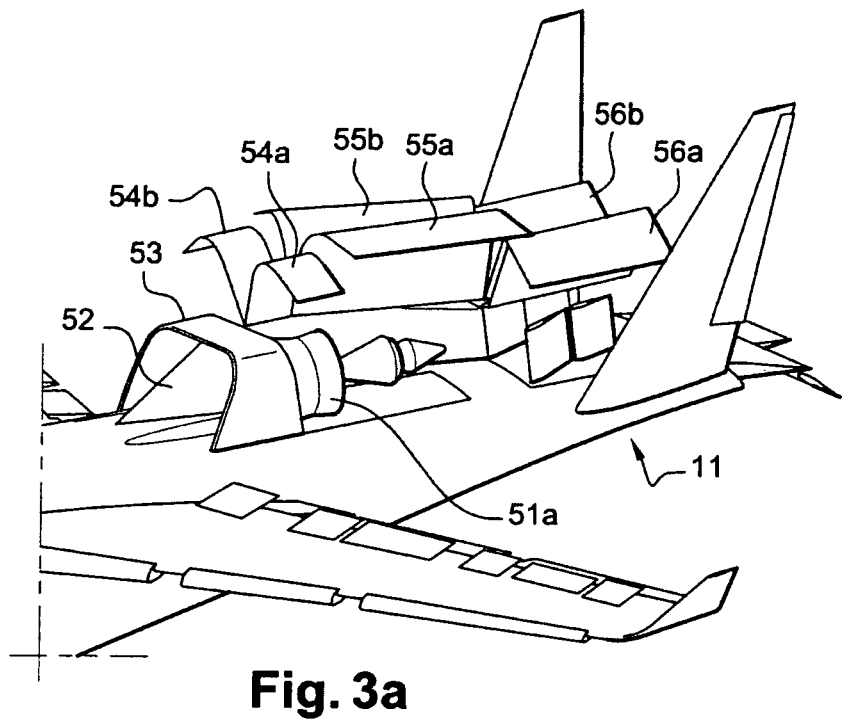
Figure 3B:
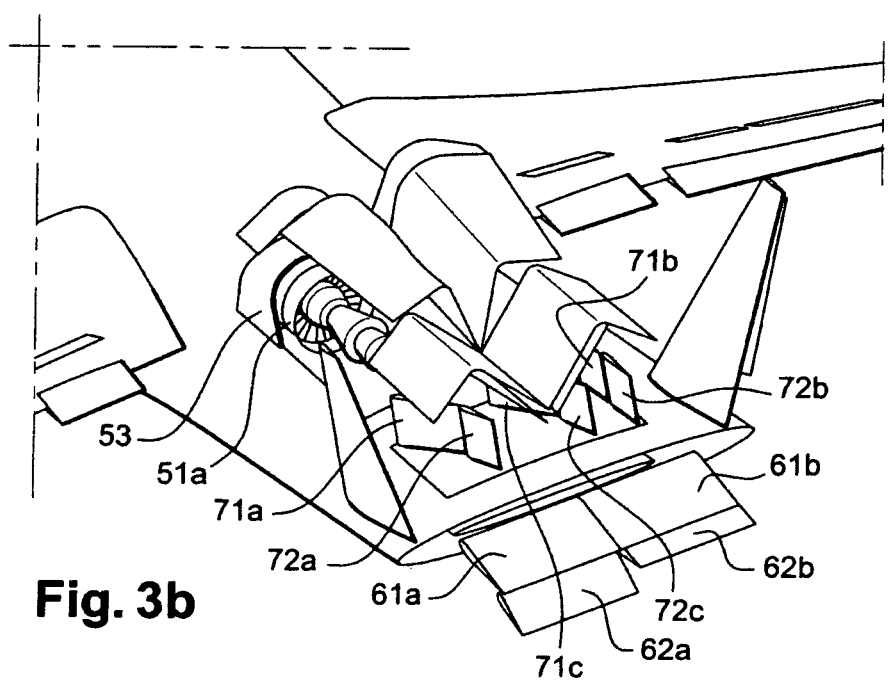
Figure 4A:
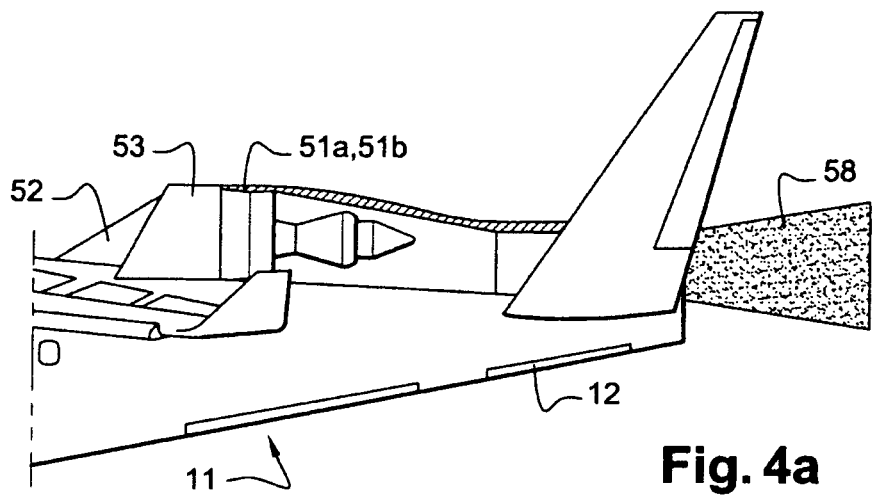
Figure 4B:
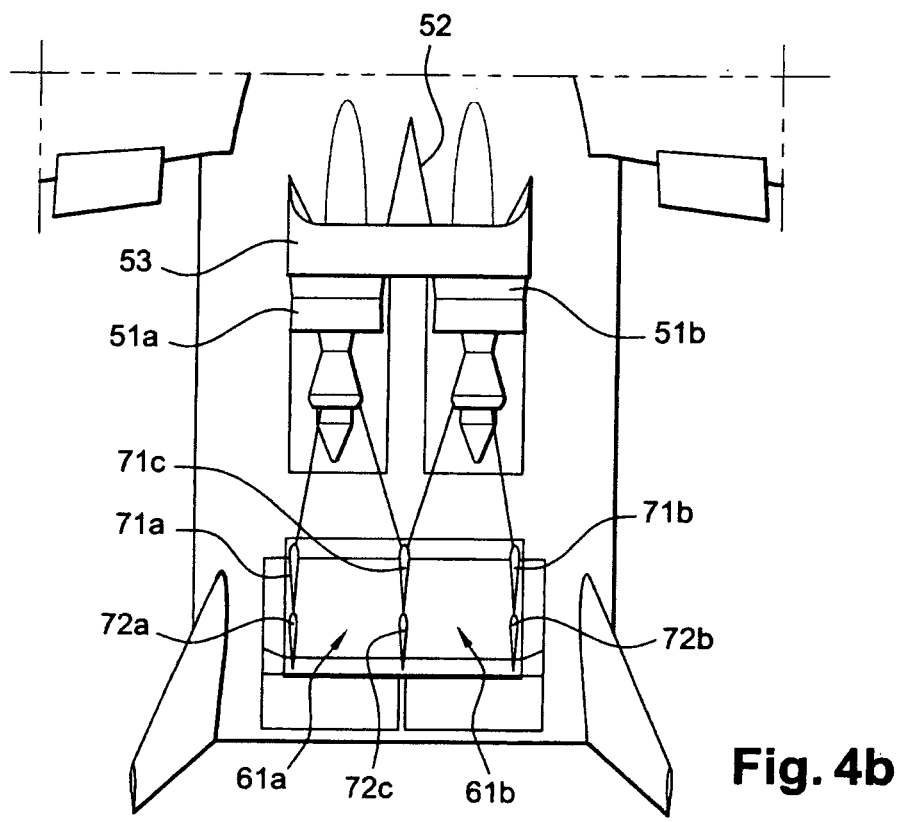
Figure 5A:
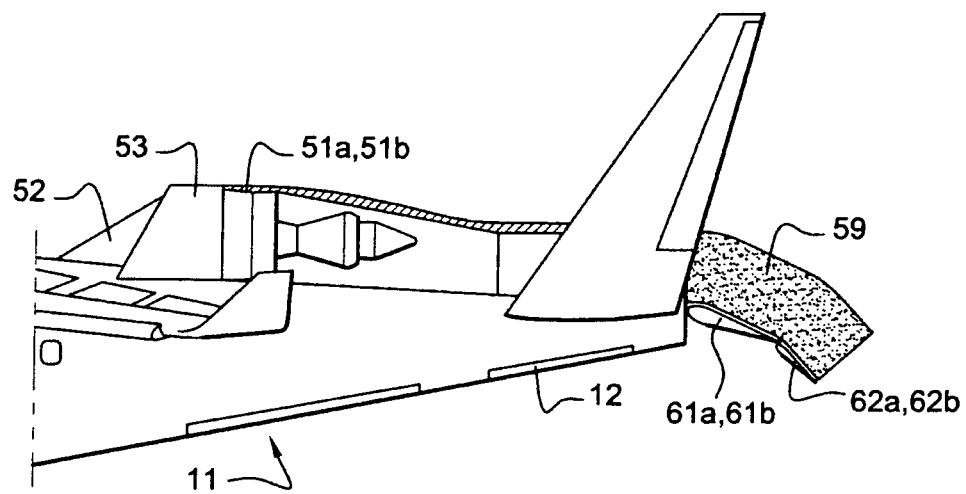
Figure 5B:
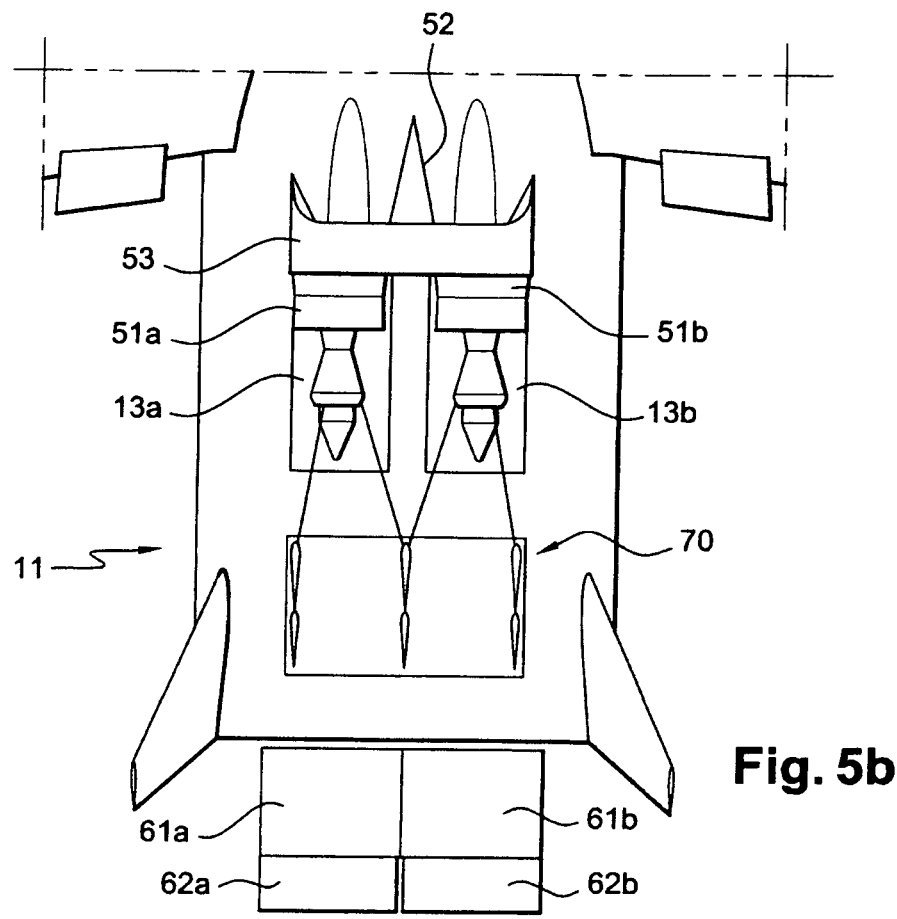
Figure 6:
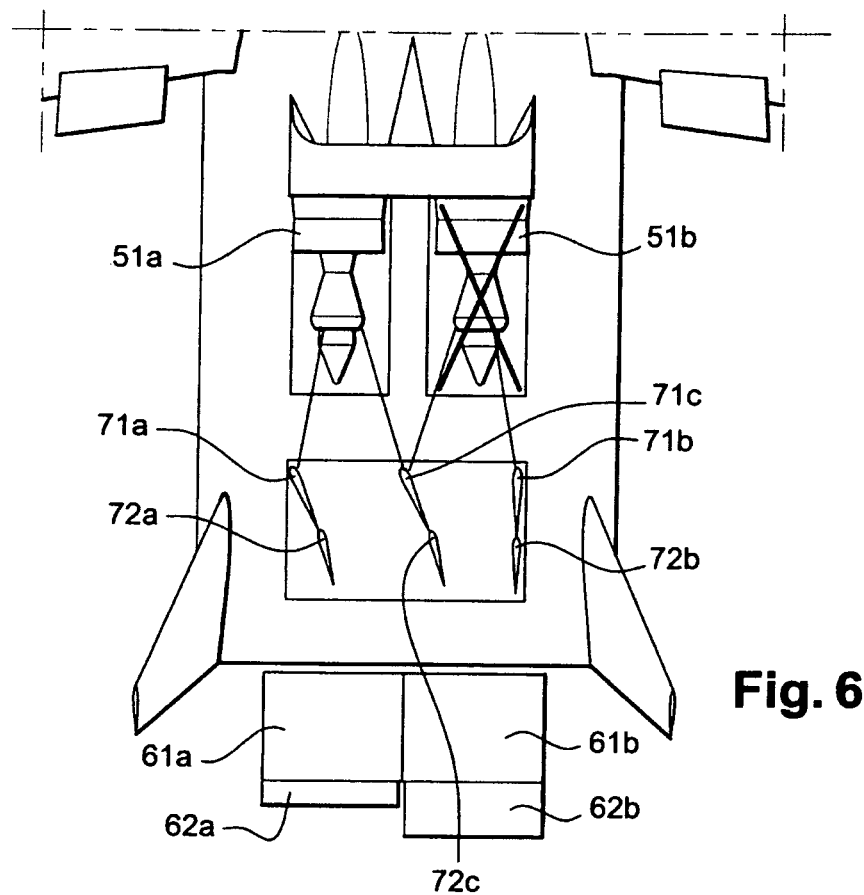
Figure 7:
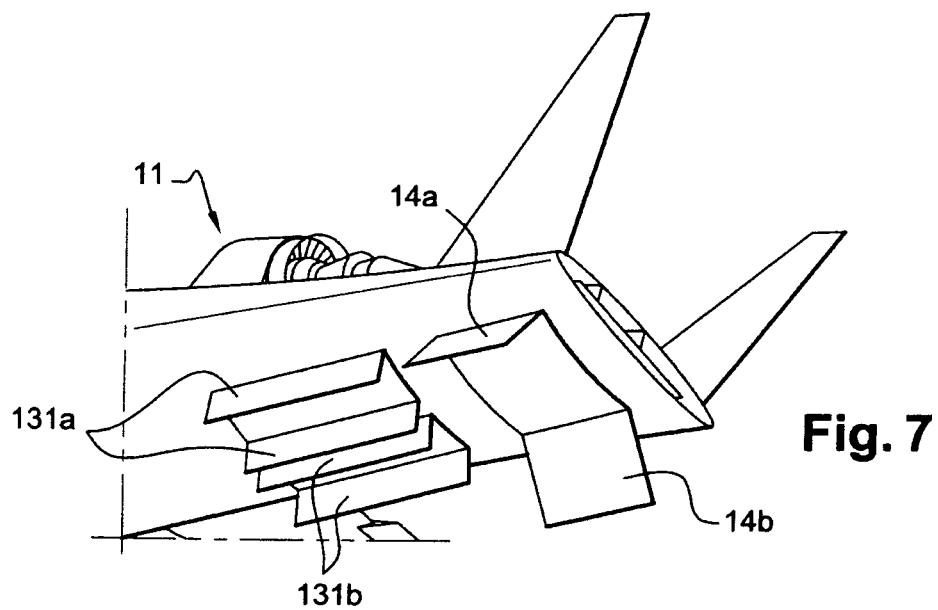

Illustration 2b: overhead view of the aircraft of illustration 1b;

Illustration 2c: front view of the aircraft of illustration 1b;

Illustrations 3a and 3b: detailed view in perspective of the arrangement of the rear part of the fuselage of the aircraft according to the disclosed embodiments, with the upper cowls open;

Illustrations 4a and 4b: views with movable cowls removed from the rear part of the fuselage of the aircraft in the cruising position, profile view of illustration 4a and overhead view of illustration 4b;

Illustrations 5a and 5b: views with movable cowls removed from the rear part of the fuselage of the aircraft of illustration 1b illustrating the configuration of the rear components in the high-lift position, profile view of illustration 5a and overhead view of illustration 5b;

Illustration 6: view with movable cowls removed from the rear part of the fuselage of the aircraft according to the disclosed embodiments in high-lift configuration with an engine dropped out;

Illustration 7: Illustration of the movable trap doors under the rear part of the fuselage.

This description of a preferred mode of embodiment is only given as a non-limiting example of embodiment.

DETAILED DESCRIPTION OF THE DRAWINGS

As shown on illustration 1a, an aircraft 1 according to the disclosed embodiments includes a fuselage 10, a wing 20, a horizontal stabilizer 30 located before the wing with respect to the direction of flight of the aircraft, called duck stabilizer, a vertical stabilizer 40 located on the rear part of the fuselage and a propulsion assembly 50 comprising propulsion jet engines secured to the rear part of the fuselage 10 on top of said fuselage.

For purposes of the description, reference is made to three main axes of a conventional aircraft reference point:

an axis X parallel to the longitudinal axis of the fuselage positively oriented towards the front of the aircraft;

an axis Z perpendicular to axis X parallel to a vertical symmetry plane of the aircraft, positively oriented downward;

an axis Y perpendicular to the plane determined by directions X and Z, positively oriented towards the right of the aircraft.

As such, the wing extends span-wise essentially according to the direction of axis Y and the fuselage in length generally according to the direction of axis X and in width according to the direction of axis Y.

In the rest of the description, unless otherwise stated, the term lift is used to describe an aerodynamic force oriented towards the height of the aircraft of which one essential component is opposed to the weight and the term negative lift s used to designate an aerodynamic force oriented towards the bottom of the aircraft of which an essential component is oriented in the direction of the weight of the aircraft.

The illustration 1a shows aircraft 1 in an aerodynamic cruising configuration, called smooth configuration.

The fuselage 10, in its rear part 11 at least, presents a width that is considerably constant, with said width being at least sufficient so that the engines are installed above the fuselage, one beside the other in the direction of the width of the fuselage.

In the example of embodiment shown in the illustrations, the aircraft includes two jet engines; however, configurations comprising a greater number of engines can be embodied.

Beneficially, as appears from illustration 2b, fuselage 10 is considerably constant in width in the back of a front tapered part, which permits creating a spacious cabin for the passengers or for a cargo payload and to have a fuselage portion available between the front tapered part and the rear part 11 that is considerably cylindrical which can be preferred in terms of the structural embodiment and ease for defining the interior arrangements of the cabin.

Wing 20 is secured to fuselage 10 on the high part of said fuselage and the duck stabilizer 30 is secured to the bottom part of the fuselage.

Other aerodynamic configurations are possible, for instance low wing and high duck stabilizer; these choices depend on the compromise between the aerodynamic stresses (aerodynamic interferences between the stabilizer and the wing), structural stresses (transfer of stresses in the fuselage structure) and layouts; these stresses may lead to different compromises according to the tasks of the aircraft and its dimensions.

Illustration 1b shows the aircraft of illustration 1a in a so-called high-lift configuration, in other words, a configuration in which the devices aimed at increasing the lifting capabilities of the aircraft occupy positions associated with increased lifts.

Three assemblies of devices aimed at increasing the lift of the aircraft are arranged on the wing for a first assembly, the so-called wing lift increase device, at the end of the fuselage for a second assembly, called 60 fuselage flap device, and in the front of the aircraft on the duck stabilizer for a third assembly, called the horizontal stabilizer lift increase device.

The wing lift increase device corresponds to conventional means for increasing the wing lift of an aircraft, in other words, essentially, wing flaps 23 on the side of one trailing edge 21 of the wing and leading edge slats 24 on the side of the leading edge 22 of wing 20.

Preferably, flaps 23 and leading edge slats 24 are defined with known dimensions, forms and principles to favor the creation of strong lift coefficients.

In particular, the extensions of flaps 23 and of the leading edge slats 24 in the direction of the span of wing 20 are at maximum, in other words that said flaps and leading edge slats extend with the minimum of discontinuity between the wing roots on the fuselage side and the ends of the wing span (removed from the fuselage according to axis Y).

This maximum extension almost without discontinuity according to the span is made possible by the absence of the engine secured to the wing, among other.

The fuselage flap device 60 essentially includes movable flaps position in the extension of the rear part 11 of the fuselage.

Said flaps are arranged in such a way that an air flow, discharged towards the rear of the aircraft by jet engines 51a, 51b of the propulsion assembly 50 located above the fuselage 10, flows over the top surfaces of the flaps.

By the effect obtained, called blowing, the flaps on the one hand produce a greater lift with a given deflection than in the absence of blowing and on the other hand are in a position to be deflected downward with high deflection angles with respect to a reference axis that is considerably horizontal with the fuselage, parallel to axis X, which overall leads to high lift coefficients thanks to the aerodynamic effect known as Coanda effect coming from the aerodynamics engineer, Henry Coanda, who showed this effect. As such, fuselage flap device 60 takes part in increasing the overall lift of the aircraft.

Operation of this fuselage flap device will be detailed later in the description.

The third assembly or horizontal stabilizer lift increase device is associated with conventional means of maximum lift increase of a bearing surface, in other words, for instance, in the same way as for a wing, leading edge slats and or trailing edge flaps, that are associated with the duck stabilizer. For the example of the illustrations, only flaps 31 of trailing edges of the front stabilizer 30 are shown.

The use of a duck stabilizer for a short takeoff and landing aircraft has the known advantage of working in the direction of a lift creation to create a torque to pull up the nose of the aircraft which has the effect of participating positively in lifting the aircraft when the trailing edge flaps are used on a wing by reason of a diving torque generated by such flaps, while a conventional horizontal stabilizer in the rear balances out such a diving torque by a negative lift of the stabilizer that reduces as such the overall lift of the aircraft.

In addition, during a rotation at takeoff, the duck stabilizer creates a lift to bring the wing at an angle while a rear stabilizer creates a negative lift to obtain the same result.

In the case of the high-lift configuration of aircraft 1, the fuselage flap device 60 induces as a result of creating a lift at the end of the fuselage, a diving torque that requires an increase of the duck stabilizer lift to balance out the aircraft according to a pitch axis parallel to axis Y, which favors the desired total lift increase. In the case of the smooth configuration of the aircraft, the fuselage flaps are not used to create additional lift and beneficially the lift increase device of the horizontal stabilizer can be in a retracted position, as shown by illustration 1a, and serve as depth rudder for aircraft pitch control.

To ensure the longitudinal control of the aircraft, the duck stabilizer is fully movable, called a one-piece stabilizer, or else is provided with a trailing edge articulated rudder.

As just explained, operation of the fuselage flap device 60, associated with the propulsion assembly 50, is essential for the disclosed embodiments.

In order to create high lift during the takeoff and landing phases, whereby lift combines with the lift of the aerodynamic surfaces of the wing and the duck stabilizer using conventional means of increasing maximum lift, the fuselage flap device 60 includes fuselage flaps 61a, 61b in the back of fuselage 10, with said flaps being articulated with respect to fuselage 10 so as to be able to oriented between a first position considerably according to the axis of the fuselage, in other words, considerably horizontal with the axes linked to the aircraft, and a second position inclined downward.

Preferably, the fuselage flap device 60 includes at least a flap 61a, 61b of the fuselage that is considerably located in the extension of each jet engine, 51a, 51b respectively, of the propulsion assembly 50 so that the air flow accelerated by the jet engines, accelerates, in other words, blast, air that passes over a higher surface, the top skin, of the flap when said flap is in the so-called out position. Blowing is known as a method for permitting to increase the lift with deflection as well as the maximum deflection angle of a flap, and as such, the possible maximum lift coefficient, by pushing back the conditions of appearance of aerodynamic takeoffs thanks to the Coanda effect.

Beneficially each fuselage flap 61a, 61b also includes an additional trailing edge flap 62a, 62b to increase the total deflection of the fuselage flap device 60 under satisfactory aerodynamic conditions. The additional trailing edge flaps 62a, 62b are for instance flaps that are simply articulated onto fuselage flaps 61a, 61b or slot flaps and they even include, as applicable, additional trailing edge flaps (not shown).

Flaps 61a, 61b, 62a, 62b of the fuselage flap device 60 include, besides the out position as described before and in which the flaps can be deflected, a position, called retracted position, in which a part of the flaps are oriented, for to be considerably in the extension of the rear part of the fuselage to which the fuselage flaps 61a, 62b are articulated and on the other hand, at least partially, are housed inside the fuselage.

As a principal function, the fuselage flap device 60 is used as a high lift configuration to generate an aerodynamic lift essentially aimed at participating in the overall lift of the aircraft.

As a possible secondary function, the fuselage flap device 60 is also used to ensure the longitudinal control of the aircraft in cooperation with the duck stabilizer.

In the high lift configuration, the defection of flaps 61am 61bm 62a, 62b of the fuselage flap device 60 is modulated to act on the pitch control torque for purposes of piloting or stability, and as applicable, to participate in a roll control of the aircraft by performing a different deflection of the flaps located on either side of the XZ vertical symmetry plane of the aircraft.

In a smooth configuration, a part of the 60 fuselage flap device is then maintained, at least during certain phases of flight, outside the fuselage and the deflection of flaps 61a, 61b, 62a, 62b of the 60 fuselage flap device, preferably the additional trailing edge flaps 62a, 62b, is modulated to act on the pitch control torque for purposes of piloting or stability.

The propulsion assembly 50 includes:
jet engines 51a, 51b;
stationary structural components 52, 53 forming air intakes for said jet engines;
movable structural components 54a, 54b, 55a, 55b, 56a, 56b, called movable cowls;
an assembly 70 of lateral guiding components of the flow, called deflectors, behind the engines.

Jet engines 51a, 51b are conventional jet engines, in particular for a civil transport aircraft that must be at the same time as economical and as quiet as possible; the jet engines are dual flow jet engines with great dilution rate, primarily with a dilution rate of more than 5.

Beneficially, jet engines 51a, 51b are secured to the stationary structural components which themselves form one part with the fuselage structure. To meet the needs of simple assembly and disassembly similar to the techniques presently used when the engines are hanging under an aircraft wing by a carrying strut, each engine shall preferably be secured to its upper part to the stationary structure 53 that wraps partially around the jet engines by means of carrying strut (not shown).

Stationary structure 52 between the two engines contributes beneficially to the rigidity of the structures onto which the engines are mounted.

Said stationary structure 52 extends forward in the air intake area of the jet engines and extends towards the back at least over a distance associated with the extension area of the engines according to the longitudinal axis X of the aircraft and forms a separating wall between the engines that is preferably reinforced to ensure a shield-type protection of the adjacent engine or engines in case a portion of an engine explodes.

One of the main functions of the stationary structural components and of the movable cowls is to create channels for the aerodynamic flows of air coming from the jet engines.

On the outside faces, the stationary structure 53 located in a front area of the propulsion assembly 50 and the movable cowls 54a, 54b, 55a, 55b, 56a, 56b for instance articulated onto the stationary structure 53, form a continuous surface that ensures the quality of the aerodynamic flow around the propulsion assembly 50 while permitting easy access to the engines and to the deflectors for maintenance purposes.

On the inner faces, the stationary structure 53 located in the front area of the propulsion assembly 50, associated with a forward area of the stationary structure 52, ensures the form of the air intakes for the jet engines and the movable cowls 54a, 54b, 55a, 55b, 56a, 56b in association with the stationary structure 52 form flow channels for the air flows leaving the jet engines.

The air coming from each jet engine 51a, 51b is thus guided in a channel specifically for the engine in question up to the rear outlets of said channels, near the rear end of the fuselage and near the fuselage flaps 61a, 61b when said fuselage flaps are in the out position.

In there rear parts, the channels have inner sections that are considerably rectangular and include aerodynamic surfaces that are considerably vertical and that form an assembly of deflectors 70, arranged in the channels and determining, at least partially, vertical walls for the channels.

Deflectors 71a, 71b, 71c, 72a, 72b, 72c are adjustable so that the air flow leaving each engine is offset in a lateral direction considerably according to axis Y of the aircraft axes, to the left or to the right of the aircraft according to the adjustment (orientation) angles given to said deflectors.

Even though deviated laterally, the air flow moving along in a channel is always ejected towards the back of the aircraft according to a direction that is considerably parallel to axis X of the aircraft by means of deflectors each comprising articulated components, at least a first deviation component 71a, 71b, 71c and at least a second component, respectively 72a, 72b, 72c, a flow rectifier articulated on the first component, capable of being adjusted with respect to the first component in a direction contrary to the direction in which is adjusted overall the first deviation component so that the second rectifier component is always considerably adjusted or turned in the direction of axis X of the aircraft.

In an alternate form of embodiment, not shown, the second rectifier components are not articulated on the first components but installed upstream of the flow behind the first components, for instance, secured, stationary or adjustable, to the fuselage to rectify the flow when the first components deviate the air flow.

In practice, a deflector 71a and 72a on the one hand and 71b and 72b on the other hand, is positioned on each exterior side of the most external channels of a propulsion assembly, on the right side of the channel of engine 51b the most to the right on fuselage 10, and on the left side of the channel of engine 51a the most to the left on fuselage 10 with said deflector being adjustable to offset the flow from the applicable engine according to a Y direction. Its effect is to bring closer an axis of the flow to the XZ vertical symmetry plane of aircraft 1, respectively in the direction to the left of the aircraft for deflector 71b, 72b located to the right and in the direction to the right of the aircraft for deflector 71a, 72a located on the left.

A deflector 71c, 72c is also located in a extension to the rear of each central stationary part 52, a single one in the case illustrated for an aircraft 1 only comprising two jet engines, with said stationary part being interrupted before the rear output points of the channels to permit the installation of the deflector essentially between said stationary part and the rear outputs of the channels and to permit the turning of the first deviation component 71c on the right hand side or the left hand side.

A deflector is comparable with a set of articulated flaps, this is, profiled aerodynamic surfaces with a finite span, placed considerably vertically on the axes of the aircraft.

The first deviation component 71a, 71b, 71c of a deflector is turned by a rotation around an axis located essentially near the leading edge of the first component.

The second rectifier component 72a, 72b, 72c of a deflector is articulated to the corresponding first deviation component or mounted in a stationary or articulated fashion on the aircraft structure.

To permit the movements of the deflector components with a reasonable minimum of play aerodynamically, the inside forms of the movable cowls 56a, 56b in the area of the deflectors are such that the aerodynamic channels have considerably rectangular sections.

Beneficially, the sections of a channel in the area of the deflectors are considerably constant to benefit from a simplified installation of the movable deflector components. In this case, the areas with variable sections, divergent or convergent, required for a optimized operation of the engines are limited to the channel sections in front of the areas in which the deflector components are movable.

In a conventional manner, the movable components of the deflectors are turned by means of actuators, not shown, which use any technology capable of providing the forces and the strength necessary for operating the deflectors such as hydraulic, electrical or electro-hydraulic servo-controls.

In a particular mode of embodiment, a rectifier component 72a, 72b, 72c is turned with respect to the corresponding deviation component, respectively 71a, 71b, 71c, by means of an automatic devices, such as for instance articulated rods for which the ratio called the automatic operation ratio is considerably equal to −1, in other words that the rectifier component is automatically turned or deflected in an inverse angle of deflection of the deviation component to be kept turned considerably according to the direction of axis X of aircraft 1.

In a cruise flight smooth configuration, shown on illustrations 4a and 4b, the fuselage flap device 60 is in the retracted position and the deflectors are turned according to the axis of the aircraft, in other words, the movable components of the deflector system 70 are not deflected and are in a position, called neutral position.

In this configuration, the air flow of the jet engines is accelerated towards the back considerably according to the axis of the aircraft and does not generate any particular effect that is involved in the lift. In case of failure of an engine, the thrust dissymmetry is very weak, with the engines close to the symmetry plane of the aircraft, and the dynamic pressure in flight is adequate to permit a lateral control of the aircraft under normal conditions by using the conventional aerodynamic rudders, in particular, the command rudders 41a, 41b.

In a high-lift configuration, all engines 51a, 51b during normal operation, as shown in illustrations 5a and 5b, with the fuselage flaps being extended and more or less turned downward, the movable components of the deflector system are in the neutral position.

Blowing of the fuselage flaps created by the engines is then perfectly symmetrical and the other lift surfaces, the duck stabilizer 30 in particular, are then operated to ensure the longitudinal pitch balance of the aircraft.

Due to the high lift generated by the fuselage flap system 60 during the high lift configuration, the longitudinal balance of the aircraft 1 is possible by increasing the lift of the duck stabilizer 30, permitted in particular by the lift increase devices 31 of the horizontal stabilizer.

If an engine stops operating normally and stops providing flap blowing or blowing of the fuselage flap part located in the area of its nozzle flow-out, on the one hand, there is a loss of lift linked to the blowing loss and on the other hand, a lift dissymmetry, except in the case of an axial engine for instance in a version not shown for the disclosed embodiments that includes a propulsion group with 3 jet engines, with respect to an XZ vertical plane of symmetry of the aircraft.

Since the high-lift configurations are used in critical flight phases of aircraft 1, takeoff and landing phases, the loss of rear lift on the fuselage flap system is critical.

On the one hand, if the aircraft does not have sufficient speed, it shall not be able to continue flying while maintaining a minimal climbing slope required for safety reasons, or even to ensure its aerodynamic lift.

On the other hand, by reason of the lack of balance of the aircraft during pitching, it is necessary to undertake a rapid action, essentially at the duck stabilizer level configured before the failure to balance the diving moment of the fuselage flap system 60, to reduce the download due to the loss of rear lift.

To reduce the consequences of a failed engine, as shown in illustration 6, the deflectors of the deflector device 70 are operated, on the one hand, to ensure a blowing of the fuselage flaps as homogeneously as possible with the engine or engines remaining in service and on the other hand, to bring said blowing as closely as possible to a symmetrical configuration for the fuselage flaps.

Illustration 6 shows in the case of an aircraft with two jet engines, a situation in which the left engine 51a is operating and the right engine 51b is out of order.

The deflectors determining the jet channel for engine 51a in operation are then turned laterally so that the air flow ejected by said engine in operation is close to the axis of the aircraft. The channel corresponding to the jet of the failed engine is partially closed off which is without significant effect since said failed engine does no longer participate in the propulsion or in the blowing of the fuselage flaps.

As such, on the one hand, the flow over the fuselage flaps is made more symmetrical and on the other hand, an important part of the span of said fuselage flaps remains exposed to the blowing by reason not only of the jet air coming from the jet engine in operation that directly affects the fuselage flaps over a width that is considerable equal to the width of the blowing channel but also by an air flow that on the sides of said jet is driven by the jet flow.

As such, even if the flow intensity is less on the sides of the jet of the engine in operation, the fuselage flaps remain affected by the blowing over practically their full span according to Y. Of course, this phenomenon is even more distinct in the case of an engine with more than two engines when a single engine drops out.

In another mode of implementation of the deflector device 70, the deflectors are turned to optimize flap blowing by the engines, while even all engines are in operation, when the flap system 60 displays a failure that does not permit ensuring identical deflection for a first set of flaps 61a, 62a and a second set of flaps 61b, 62b.

In a special form of embodiment of aircraft 1, maintenance wells 13a, 13b are provided in the fuselage vertically of jet engines 51a, 51b.

Besides maintenance activities, these wells covered by trap doors 131a, 131b permit lowering each engine from its suspended position onto aircraft 1 to stationary structure 53 up to tooling means (not shown) located under the fuselage. Such an arrangement permits operations of assembly and disassembly of the engine with conventional lifting means secured to stationary structure 53 in the same manner as in the case of a jet engine hanging under an aircraft wing, in spite of an assembly that may appear less accessible initially.

Beneficially, the fuselage includes inspection and maintenance wells in the form of panels 14a, 14b for maintenance, for instance articulated panels on the fuselage, located under the rear part of the fuselage in the deflector system area 70 to make the devices accessible, not shown, for the articulation of deflectors and fuselage flaps as well as activators for the movable components.

As such, the disclosed embodiments permit embodying an aircraft with at least two propulsion jet engines for which the high-lift configuration permits obtaining high lifts that are not brought in question again in an unacceptable way due to the failure of a jet engine.

The invention claimed is:

1. An aircraft comprising:
a fuselage;
at least one wing secured to the fuselage;
a front horizontal stabilizer secured to the fuselage on a side of a front end of the fuselage with respect to the wing according to a longitudinal axis X of the aircraft;
at least first and second propulsion jet engines;
wherein the at least first and second propulsion jet engines are arranged side by side inside a stationary structure of a propulsion assembly, the propulsion assembly located on a top of the fuselage, said stationary structure forming one part with a structure of the fuselage, and such that rear outlets of the stationary structure are proximate a rear end of the fuselage;
a fuselage high lift flap device arranged at the rear end of the fuselage, and comprising at least one fuselage high lift flap configured to adopt a first position wherein the at least one fuselage high lift flap is located substantially horizontal with respect to reference axes of the aircraft and extending beyond the rear outlets in the longitudinal direction of the aircraft, and to adopt at least a second position, wherein the at least one fuselage high lift flap is deflected downward with respect to the first position;
wherein the stationary structure comprising the at least first and second propulsion jet engines and the fuselage high lift flap device are arranged on the fuselage such that the engines blow air along a top skin of the at least one fuselage high lift flap; and
wherein the at least one fuselage high lift flap has at least one position wherein said at least one fuselage high lift flap is totally or partially retracted in an interior space of the rear part of the fuselage.

2. An aircraft according to claim 1, wherein the at least one fuselage high-lift flap of the fuselage high-lift flap device comprises at least one trailing edge flap.

3. An aircraft according to claim 2, wherein the at least one fuselage high lift flap has a second position wherein the at least one fuselage high lift flap is partially retracted in an interior space of the rear part of the fuselage so that the at least one trailing edge flap can be activated.

4. An aircraft according to claim 1, wherein the fuselage high-lift flap device comprises at least an assembly of independent fuselage high-lift flaps for each engine arranged on the fuselage considerably in the back of the corresponding engine.

5. An aircraft according to claim 1, wherein the front horizontal stabilizer is equipped with maximum lift increase devices with said maximum lift increase devices being retractable.

6. An aircraft according to claim 1, wherein said stationary structures structure comprises a first structure forward of the at least first and second propulsion jet engines corresponding to an air intake of the propulsion jet engines and a second structure determining aerodynamic channels and separating walls between adjacent channels associated with adjacent propulsion jet engines, in which channels a jet of each propulsion jet engine is channeled from the corresponding jet propulsion engine up to a channel outlet near the rear end of the rear end of the fuselage.

7. An aircraft according to claim 6, wherein each propulsion jet engine of the at least first and second propulsion jet engines is secured to an upper part of the stationary structure forming the air intake of said propulsion jet engines and wherein the second structure comprises at least locally, a plurality of reinforcements to ensure the protection of each propulsion jet engine against projection from another adjacent jet propulsion engine.

8. An aircraft according to claim 6, further comprising a plurality of deflectors of the aerodynamic flow arranged in a considerably vertical fashion in the aerodynamic channels formed by the propulsion assembly, where said deflectors determine, at least partially, on one hand, vertical lateral walls on each exterior side of said aerodynamic channels, and on other hand, vertical separator walls between said aerodynamic channels, with said deflectors comprising a deviation component arranged to offset in a lateral direction an airflow leaving corresponding propulsion jet engine and to have said airflow ejected in a direction considerably parallel to the longitudinal axis X of the aircraft.

9. An aircraft according to claim 8, wherein the first deviation components of the deflectors are configured to be moved in rotation with respect to the fuselage around a rotation axis considerably vertical with respect to the aircraft.

10. An aircraft according to claim 8, wherein the deflectors of the aerodynamic flow include at least a certain first position when all propulsion jet engines are operating and include at least a given second position when one of the propulsion jet engines has failed.

11. An aircraft according to claim 8, wherein at least one of the deflectors comprises at least one second deviation component in the back of a first deviation component secured and articulated to said first deviation component or secured, and articulated or not articulated, to a structure of the aircraft to rectify a aerodynamic flow deviation in the back of the first deviation component according to the longitudinal axis X of the aircraft.

* * * * *